US008750284B2

(12) United States Patent
Zi et al.

(10) Patent No.: US 8,750,284 B2
(45) Date of Patent: Jun. 10, 2014

(54) PATH COMPUTATION METHOD, NODE DEVICE AND PATH COMPUTATION ELEMENT

(75) Inventors: Xiaobing Zi, Shenzhen (CN); Chuanjun Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 214 days.

(21) Appl. No.: 13/095,477

(22) Filed: Apr. 27, 2011

(65) Prior Publication Data

US 2011/0199939 A1 Aug. 18, 2011

Related U.S. Application Data

(63) Continuation of application No. PCT/CN2009/074503, filed on Oct. 19, 2009.

(30) Foreign Application Priority Data

Oct. 27, 2008 (CN) .......................... 2008 1 0175122

(51) Int. Cl.
*H04L 12/28* (2006.01)

(52) U.S. Cl.
USPC .............................. 370/351; 370/254; 398/45

(58) Field of Classification Search
USPC ......... 370/235, 238, 351, 254, 216–221, 248; 398/45–101
See application file for complete search history.

(56) References Cited

U.S. PATENT DOCUMENTS

| | | | | |
|---|---|---|---|---|
| 2004/0184441 A1* | 9/2004 | Wu et al. | ........................ | 370/351 |
| 2006/0067235 A1* | 3/2006 | Acharya et al. | ................ | 370/238 |
| 2007/0047469 A1 | 3/2007 | Vasseur et al. | | |
| 2008/0225723 A1* | 9/2008 | Lee et al. | ....................... | 370/235 |
| 2009/0135841 A1* | 5/2009 | Vasseur et al. | ................ | 370/401 |
| 2009/0285101 A1* | 11/2009 | Lu | ................................. | 370/238 |

FOREIGN PATENT DOCUMENTS

| | | |
|---|---|---|
| CN | 1866852 A | 11/2006 |
| CN | 1949744 A | 4/2007 |
| CN | 101001201 A | 7/2007 |
| CN | 101095311 A | 12/2007 |
| EP | 1863235 A1 | 12/2007 |

OTHER PUBLICATIONS

Extended European Search Report in corresponding European Patent Application No. 09823051.9 (Aug. 27, 2012).

(Continued)

*Primary Examiner* — Dang Ton
*Assistant Examiner* — Mandish Randhawa
(74) *Attorney, Agent, or Firm* — Leydig, Voit & Mayer, Ltd.

(57) ABSTRACT

A path computation method is provided. A node device and a path computation element (PCE) are also provided correspondingly. The path computation method includes: sending a path computation request message to the PCE after receiving a client-side service transmission request, the path computation request message carrying identifiers of a source node and a destination node that access a client-side service and carrying a path concatenation constraint; and receiving the path computation response message carrying path information returned by the PCE, the path information being obtained by the PCE through computation according to the identifiers of the source node and the destination node that accesses a client-side service, the concatenation constraint, and concatenation capabilities of each interface of nodes in a network. The technical solution of the present invention is simpler and more convenient, which obviously reduces the complexity of the specific implementation.

10 Claims, 4 Drawing Sheets

(56) References Cited

OTHER PUBLICATIONS

Mannie et al., "Traffic Engineering Extensions to OSPF for Generalized MPLS Control of Sonet/SDH Networks," Internet Draft, Nov. 2002, Internet Engineering Task Force, Reston, Virginia.

Vasseur et al., "Path Computation Element (PCE) Communication Protocol (PCEP) draft-ietf-pce-pcep-16.txt," Internet Draft, Oct. 14, 2008, Internet Engineering Task Force, Reston, Virginia.

International Search Report in corresponding PCT Application No. PCT/CN2009/074503 (Jan. 28, 2010).

International Searching Authority, Written Opinion of the International Searching Authority in International Application No. PCT/CN2009/074503 (Jan. 28, 2010).

Bernstein et al., CCAMP Working Group, Memo, "Operating Virtual Concatenation (VCAT) and the Link Capacity Adjustment Scheme (LCAS) with Generalized Multi-Protocol Label Switching (GMPLS)," draft-ietf-ccamp-gmpls-vcat-lcas-04.txt (Feb. 5, 2008).

Vasseur et al., CCAMP Working Group, Memo, "Path Computation Element (PCE) Communication Protocol (PCEP)," draft-ietf-pce-pcep-12.txt (Mar. 24, 2008).

* cited by examiner

FIG. 6

# PATH COMPUTATION METHOD, NODE DEVICE AND PATH COMPUTATION ELEMENT

CROSS-REFERENCE TO RELATED APPLICATIONS

This application is a continuation of International Application No. PCT/CN2009/074503, filed on Oct. 19, 2009, which claims priority to Chinese Patent Application No. 200810175122.9, filed on Oct. 27, 2008, both of which are hereby incorporated by reference in their entireties.

FIELD OF THE INVENTION

The present invention relates to the field of communications technologies, and more particularly to a path computation method, a node device, and a path computation element (PCE).

BACKGROUND OF THE INVENTION

Devices of a client network are connected to one another through a physical channel provided by a service network, and specifically, service network devices of two ends (that is, a source end and a destination end) are connected to two client network devices respectively. When a signal is transmitted, a source end device of the service network encapsulates and adapts a client network signal into a carrier signal that can be transmitted in the service network, and transmits the carrier signal to the destination end of the service network, and the destination end of the service network restores the client signal and sends the restored client signal to the client network device. When a rate of the client network signal is higher than that of the carrier signal in the service network, it is necessary to combine a plurality of carrier signals in the service network to transmit the client signal. Therefore, it is a problem to compute a path that satisfies client-side network signal transmission in a service-side network.

One solution of computing a path in the prior art is that: A node receiving a client-side service request serves as a head node of a path, and the head node is responsible for computing the path of the client-side service request.

When the service-side network is of a very large scale, the network is divided into a plurality of smaller network domains so that topology information about each network domain may not be flooded to other network domains, thus preventing network congestion caused by excessive flooded topology information in the network. Another solution of computing a path in the prior art is that: A node receiving a client-side service request serves as a head node of a domain where the node is located, so as to compute a path in the domain, a node in the domain where the head node is located and which is connected to other domains selects a next-domain node on a path that satisfies the client-side service demands, the next-domain node is responsible for computing the path in the domain in which the next-domain node is located, and a node in a domain where the next-domain node is located and which is connected to other domains selects a next-domain node on a path that satisfies the client-side service demands, so as to compute and obtain a cross-domain path finally.

However, for the aforementioned one solution of computing a path in the prior art, each node may serve as a head node to be responsible for computing a path, and when the network is of a very large scale, path computation may increase the burden of the node due to limited processing capability of the node. As for the aforementioned another solution of computing a path in the prior art, cross-domain computation can be accomplished only when a plurality of nodes in the network participates in the computation, and the solution is rather complex.

SUMMARY OF THE INVENTION

Embodiments of the present invention provide a path computation method, a node device and a path computation element (PCE), so as to implement path computation simply and conveniently.

An embodiment of the present invention provides a path computation method, where the method includes:

receiving concatenation capabilities of each interface, where the concatenation capabilities of each interface are sent by nodes in a network; receiving a path computation request message carrying identifiers of a source node and a destination node that access a client-side service and carrying a path concatenation constraint; computing a path according to the identifiers of the source node and the destination node that access a client-side service, the concatenation constraint, and the concatenation capabilities of the each interface of the nodes in the network; and sending a path computation response message carrying path information obtained through computation.

An embodiment of the present invention further provides a path computation method, where the method includes:

sending a path computation request message to a PCE after receiving a client-side service transmission request, the path computation request message carrying identifiers of a source node and a destination node that access a client-side service and carrying a path concatenation constraint; and receiving a path computation response message carrying path information returned by the PCE, the path information being obtained by the PCE through computation according to the identifiers of the source node and the destination node that access a client-side service, the concatenation constraint, and concatenation capabilities of each interface of nodes in a network.

An embodiment of the present invention further provides a path computation method, where the method includes:

receiving concatenation capabilities of each interface, where the concatenation capabilities of each interface are sent by nodes in a network; receiving a path computation request message carrying identifiers of a source node and a destination node that access a client-side service and carrying a signal type of a client-side transmission service; determining a path concatenation constraint according to the signal type of the client-side transmission service; computing a path according to the identifiers of the source node and the destination node that access a client-side service, the concatenation constraint, and the concatenation capabilities of the each interface of the nodes in the network; and sending a path computation response message carrying path information obtained through computation.

An embodiment of the present invention further provides a path computation method, where the method includes:

sending a path computation request message to a PCE after receiving a client-side service transmission request, the path computation request message carrying identifiers of a source node and a destination node that access a client-side service and carrying a signal type of a client-side transmission service; and receiving a path computation response message carrying path information returned by the PCE, the path information being obtained by the PCE through computation according to a concatenation constraint determined in accordance with the signal type of the client-side transmission service, the identifiers of the source node and the destination node that access a client-side service, and concatenation capabilities of each interface of nodes in a network.

An embodiment of the present invention provides a PCE, where the PCE includes:

a node capability receiving module, configured to receive concatenation capabilities of each interface, where the concatenation capabilities of each interface are sent by nodes in a network;

a request message receiving module, configured to receive a path computation request message carrying identifiers of a source node and a destination node that access a client-side service and carrying a path concatenation constraint;

a path computing module, configured to compute a path according to the identifiers of the source node and the destination node that access a client-side service, the concatenation constraint, and the concatenation capabilities of the each interface of the nodes in the network; and a response message sending module, configured to send a path computation response message carrying path information obtained through computation.

An embodiment of the present invention provides a node device, where the node device includes:

a request message sending module, configured to send a path computation request message to a PCE after receiving a client-side service transmission request, the path computation request message carrying identifiers of a source node and a destination node that access a client-side service and carrying a path concatenation constraint; and a response message receiving module, configured to receive a path computation response message carrying path information returned by the PCE after the request message sending module sends the path computation request message to the PCE, the path information being obtained by the PCE through computation according to the identifiers of the source node and the destination node that access a client-side service, the concatenation constraint, and concatenation capabilities of each interface of nodes in a network.

An embodiment of the present invention further provides a PCE, where the PCE includes:

a node capability receiving module, configured to receive concatenation capabilities of each interface, where the concatenation capabilities of each interface are sent by nodes in a network;

a request message receiving module, configured to receive a path computation request message carrying identifiers of a source node and a destination node that access a client-side service and carrying a signal type of a client-side transmission service;

a determining module, configured to determine a path concatenation constraint according to the signal type of the client-side transmission service;

a path computing module, configured to compute a path according to the identifiers of the source node and the destination node that access a client-side service, the concatenation constraint, and the concatenation capabilities of the each interface of the nodes in the network; and a response message sending module, configured to send a path computation response message carrying path information obtained through computation.

An embodiment of the present invention further provides a node device, where the node device includes:

a request message sending module, configured to send a path computation request message to a PCE after receiving a client-side service transmission request, the path computation request message carrying identifiers of a source node and a destination node that access a client-side service and carrying a signal type of a client-side transmission service; and a response message receiving module, configured to receive a path computation response message carrying path information returned by the PCE, the path information being obtained by the PCE through computation according to a concatenation constraint determined in accordance with the signal type of the client-side transmission service, the identifiers of the source node and the destination node that access a client-side service, and concatenation capabilities of each interface of nodes in a network.

According to the above technical solutions, after a client-side service transmission request is received, a path computation request message is sent to a PCE, and the PCE computes a concatenation path; the PCE firstly receives concatenation capabilities of each interface, where the concatenation capabilities of each interface are sent by nodes in a network, and computes a path according to a source node and a destination node of the client-side transmission service, a path concatenation constraint, and other conditions carried in the path computation request message. Compared with the solution of computing a path crossing a plurality of network domains in a large-scale network in the prior art, the technical solution according to the embodiments of the present invention is simpler and more convenient, which obviously reduces the complexity of the specific implementation.

BRIEF DESCRIPTION OF THE DRAWINGS

To illustrate the technical solutions according to the embodiments of the present invention more clearly, the accompanying drawings for describing the embodiments are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

Embodiments of the present invention provide a path computation method, and further provide a corresponding node device and a PCE, which are described below in detail respectively.

In a time division multiplex (TDM) network, a plurality of carrier signals may provide signal transmission services to a client-side network by adopting a concatenation technology. The concatenation technology is divided into contiguous concatenation and virtual concatenation. The contiguous concatenation uses different time slots of the same node interface to transmit signals, and thus the node interface is required to have contiguous idle time slots to transmit the signals; and since the contiguous concatenation uses two or more contiguous idle time slots of the node interface to transmit the signals, the contiguous concatenation can fulfill the concatenation function. The virtual concatenation is developed in the situation that the contiguous concatenation cannot satisfy requirements of a current network device. A source node on a virtual concatenation path converts a contiguous concatenation path into a virtual concatenation path, and a destination node on the virtual concatenation path restores the virtual concatenation path to a contiguous concatenation path. The virtual concatenation uses idle time slots of different node interfaces to transmit signals, and a plurality of links is required to participate in concatenation according to different transmission services, and thus it is required that a delay of each link participating in the concatenation should not be too long, so as to ensure that a differential delay of each virtual concatenation path can satisfy differential delay constraints of the source node and the destination node on the virtual concatenation path. The differential delay constraints of the source node and the destination node are delay time for buffering data transmitted over each concatenation path.

The path computation method, the node device and the PCE according to the embodiments of the present invention are described below respectively in terms of computation of a single path, a contiguous concatenation path, and a virtual concatenation path.

Embodiment 1

The embodiment of the present invention describes a path computation method, a node device and a PCE by taking a synchronous digital hierarchy (SDH) network as an example. Certainly, the computation method, the node device and the path computation element according to the embodiment of the present invention are also applicable to other TDM networks, for example, an optical transport network (OTN).

In this embodiment, a PCE is constructed in a service-side network, and the PCE is a functional entity responsible for path computation in the network. Based on a known network topology structure and a constraint, the PCE computes a concatenation path satisfying the constraint according to a request from a path computation client (PCC). The PCE may be located anywhere in the network, may be integrated in a network device, or may be an independent device. The PCC requests the PCE to compute a path and receives a path returned by the PCE. The PCC and the PCE, and PCEs conduct communication through a PCE protocol (PCEP), and a PCEP message may be used for submitting a path computation request and obtaining a path computation result.

This embodiment describes the path computation method according to the embodiment of the present invention with computation of a contiguous concatenation path and a virtual concatenation path. In this embodiment, a node receiving a client-side service transmission request sends a path computation request message to a PCE, where the message carries a concatenation constraint for establishing a path, and the concatenation constraint includes concatenation unit, concatenation number, and concatenation type; and the PCE directly computes a concatenation path satisfying the requirements according to the concatenation constraint after receiving the path computation request message.

Figure 1:
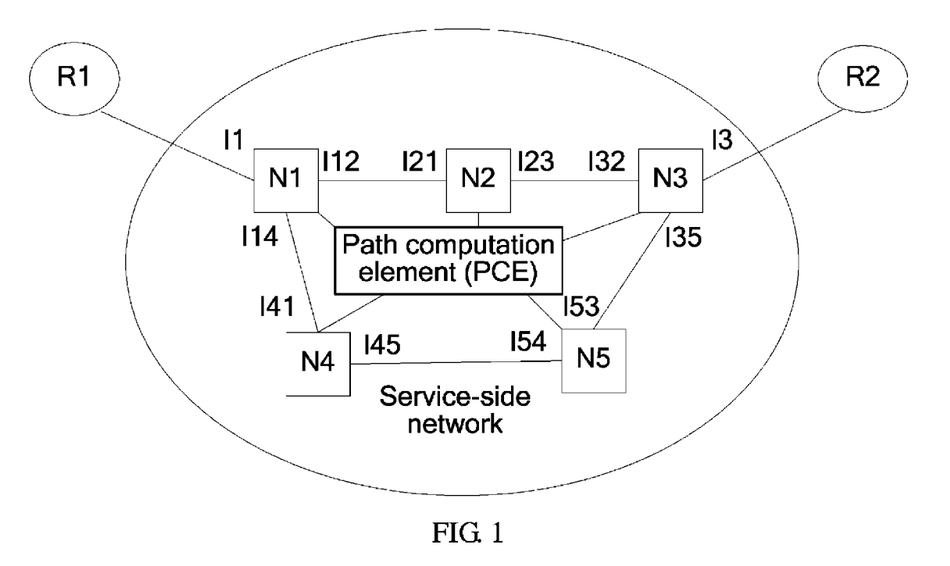
FIG. 1 is a schematic structural view of a service-side network according to an embodiment of the present invention.

FIG. 1 shows a structure of a service-side network and a structure for connecting to a client-side network.

By taking an SDH network as an example, the service-side network includes five nodes, interfaces of the nodes have corresponding interface numbers I1, I14, I12, I21, I23, I3, I32, I35, I53, I54, I45, and I41 (I represents Interface), and nodes N1 and N3 are connected to a client-side network respectively. In a network which is not divided into network domains, nodes are flooded with information of each interface, such as time slot state of corresponding links, link-supported concatenation type, link delay, differential delay constraint of the interfaces, numbers of the interfaces, and numbers of the interfaces connected to a remote end. For ease of description, in the embodiments of the present invention, the link time slot state, the link delay, the link-supporting concatenation type, the interface differential delay constraint, the interface number, and the interface number connected to the remote end corresponding to each interface of the nodes in the network are called interface concatenation capability. For example, the node N1 may flood interface concatenation capabilities of interfaces I12, I14, and I1 to nodes N2, N3, N4, and N5 in the network and the PCE, and the node N2 may flood interface concatenation capabilities of interfaces I21 and I23 to the nodes N1, N3, N4, and N5 in the network and the PCE. In a network which is divided into network domains, each node in the network sends concatenation capabilities of each interface to the PCE, and the PCE receives the concatenation capabilities of each interface of nodes in the network. Generally, PCEs in the network all possess a path computation capability, including capability of computing a single path, a contiguous concatenation path, and a virtual concatenation path. However, since network conditions differ from one another, PCEs in some networks may not possess the path computation capability, or only possess the capability of computing one of the contiguous concatenation path and the virtual concatenation path, or only possess the capability of computing the single path. To adapt to requirements of different networks, in the path computation method according to the embodiments of the present invention, the PCE sends its own path computation capability to all the nodes in the network.

According to the embodiments of the present invention, the nodes in the network send concatenation capabilities of each interface through a generalized multi-protocol label switch (GMPLS) Open the Shorted Path First with TE (OSPF-TE) protocol message, and the PCE also sends its own path computation capability by using the GMPLS OSPF-TE.

To satisfy the demands of the capabilities of the nodes in the network, the embodiments of the present invention expand the GMPLS OSPF-TE protocol message, and increase a node interface concatenation capability object, where the node interface concatenation capability object is provided below:

```
+-+-+-+-+-+-+-+-+-+-+-+-+-+-+-+-+-+-+-+-+-+-+-+-+-+-+-+-+-+-+-+--
|   Reserved     |    Flags    |c|v| Delay Diff. |  TS number   |
+-+-+-+-+-+-+-+-+-+-+-+-+-+-+-+-+-+-+-+-+-+-+-+-+-+-+-+-+-+-+-+--
|                                                                |
//                       Time Slots Info.                       //
|                                                                |
+-+-+-+-+-+-+-+-+-+-+-+-+-+-+-+-+-+-+-+-+-+-+-+-+-+-+-+-+-+-+-+--
```

When the flag bit v is 1, it indicates the link supports virtual concatenation, Delay Diff. indicates an interface differential delay constraint; when the flag bit c is 1, it indicates that the link supports contiguous concatenation; TS number represents the number of time slots; and Time Slots Info. represents occupation of each time slot in the link by means of a bitmap.

To satisfy the demand for sending its own path computation capability to the nodes in the network by the PCE, the embodiments of the present invention expand the GMPLS OSPF-TE protocol message, and increase a PCE path computation capability object specifically as follows:

```
+-+-+-+-+-+-+-+-+-+-+-+-+-+-+-+-+-+-+-+-+-+-+-+-+-+-+-+-+-+-+-+-+
|    Reserved    |   Flags  |c|v|         Reserved             |
+-+-+-+-+-+-+-+-+-+-+-+-+-+-+-+-+-+-+-+-+-+-+-+-+-+-+-+-+-+-+-+-+
```

When the flag bit c is 1, it indicates that the PCE has a contiguous concatenation path computation capability; and when the flag bit v is 1, it indicates that the PCE has a virtual concatenation path computation capability.

Finally, the nodes in the network store concatenation capabilities of interfaces of the nodes in the network and the path computation capability of the PCE. In the network which is divided into network domains, the nodes in the network store concatenation capabilities of interfaces of a node in a network domain and the path computation capability of the PCE in the network. The PCE stores the concatenation capabilities of interfaces of the nodes in the network.

When the node N1 connected to the client-side network receives a client-side service transmission request, the node N1 determines a concatenation constraint required to be provided, such as concatenation number, concatenation unit, and concatenation type, according to a bandwidth required by the request, an identifier of a destination node requesting signal transmission, and a signal type of a client-side transmission service, and sends a path computation request to the PCE.

Figure 2:
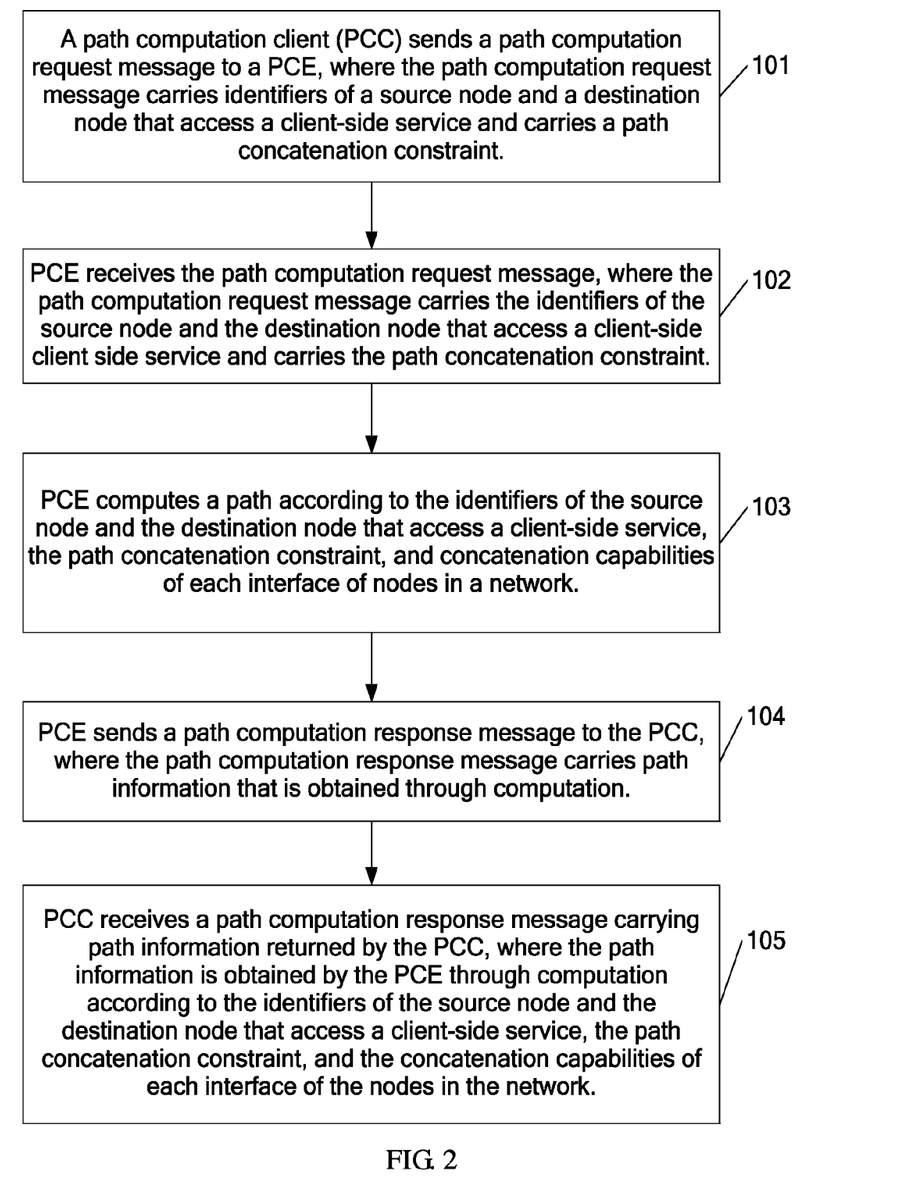
FIG. 2 is a flowchart of a path computation method according to a first embodiment of the present invention.

FIG. 2 is a flowchart of a path computation method according to a first embodiment of the present invention.

In step 101, a PCC sends a path computation request message to a PCE, the path computation request message carrying identifiers of a source node and a destination node that access a client-side service and carrying a path concatenation constraint.

In the embodiment of the present invention, the identifiers of the source node and the destination node that access a client-side service may be, for example, address information about the source node and the destination node and/or interface identifiers of the nodes, or may be other identifiers capable of identifying the source node and the destination node. The address information about the source node and the destination node may be, for example, information about an Internet Protocol (IP) address or another address, and the interface identifiers of the nodes may be, for example, address information about the nodes+local interface number, or other identifiers, to which the present invention makes no limitations.

Referring to FIG. 1 together, the node N1 serves as the PCC to send a path computation request message to the PCE.

On the assumption that the node N1 receives a client-side service transmission request, the node N1 serves as a head node of a path, and the node N3 serves as an egress node of the path. The node N1 serves as the PCC to send a path computation request message to the PCE, and sends a path computation request through a PCReq message in a PCEP protocol. The node N1 serving as the PCC determines whether a path to be established is a contiguous concatenation path or a virtual concatenation path according to a bandwidth required by the client-side transmission service, and the PCReq message carries identifiers of a source node and a destination node that access a client-side service and carrying a path concatenation constraint. By taking a path established in the service-side network as an example for illustration, a source node of the path is connected to a client-side network transmitting services, and a destination node of the path is connected to a client-side network receiving the services. When the path to be established is a contiguous concatenation path, the concatenation constraint includes concatenation unit, concatenation number, and concatenation type. When the path to be established is a virtual concatenation path, the concatenation constraint includes concatenation unit, concatenation number, and concatenation type.

The embodiments of the present invention expand a PCEP protocol, so as to carry a concatenation constraint including concatenation unit, concatenation number, and concatenation type in a PCReq message. A concatenation constraint object is increased in the PCReq message, and the format of the object is provided below:

```
+-+-+-+-+-+-+-+-+-+-+-+-+-+-+-+-+-+-+-+-+-+-+-+-+-+-+-+-+-+-+-+-+
| LSP Enc. Type  | Switching Type |Src Delay Diff. | Dst Delay Diff. |
+-+-+-+-+-+-+-+-+-+-+-+-+-+-+-+-+-+-+-+-+-+-+-+-+-+-+-+-+-+-+-+-+
| Signal Type    | Concat. Type   |    Reserved    |   LSP number    |
+-+-+-+-+-+-+-+-+-+-+-+-+-+-+-+-+-+-+-+-+-+-+-+-+-+-+-+-+-+-+-+-+
```

The concatenation unit is determined according to "LSP Enc. Type," "Switching Type" and "Signal Type." For example, when the concatenation unit is ODU2, LSP Enc. Type=12 (G.709 ODUk), Switching Type=100 (TDM), and Signal Type=2 (ODU2). When the concatenation unit is VC4, LSP Enc. Type=5 (SDH ITU-T G.707/SONET ANSI T1.105), Switching Type=100 (TDM), and Signal Type=6 (VC4).

Concat. Type indicates the concatenation type, and is currently defined as: 1 representing the contiguous concatenation, and 2 representing the virtual concatenation.

LSP number indicates the concatenation number, and when the path to be computed is the contiguous concatenation path or virtual concatenation path, the value is any value greater than 1.

Src Delay Diff. indicates a differential delay constraint of the source node; and Dst Delay Diff. indicates a differential delay constraint of the destination node.

It should be noted that, if the PCE does not store a differential delay constraint of a destination node of a concatenation path to be computed, the node N1 sending the path computation request sends a message of obtaining the differential delay constraint of the destination node to a destination node N3. In the embodiment of the present invention, the differential delay constraint of the destination node is obtained through a GMPLS call message.

The embodiments of the present invention expand a LINK_CAPABILITY object in the GMPLS call message (Notify), which carries information about a differential delay constraint of an interface.

```
+-+-+-+-+-+-+-+-+-+-+-+-+-+-+-+-+-+-+-+-+-+-+-+-+-+-+-+-+-+-+-+-+
|    Reserved    |    Flags   |v|        Max Delay Difference    |
+-+-+-+-+-+-+-+-+-+-+-+-+-+-+-+-+-+-+-+-+-+-+-+-+-+-+-+-+-+-+-+-+
|                                                                |
//                       (Subobjects)                           //
|                                                                |
+-+-+-+-+-+-+-+-+-+-+-+-+-+-+-+-+-+-+-+-+-+-+-+-+-+-+-+-+-+-+-+-+
```

The flag bit v indicates a link virtual concatenation capability; and the Max Delay Difference field indicates and records a differential delay constraint of a destination node interface.

The path computation request message sent by the PCC may further carry differential delay constraints of the source node and the destination node that access a client-side service.

In step 102, the PCE receives the path computation request message, the path computation request message carrying the identifiers of the source node and the destination node that access a client-side service and carrying the path concatenation constraint.

The PCReq message received by the PCE carries the identifiers of the source node and the destination node that access a client-side service and the path concatenation constraint, and the path concatenation constraint includes concatenation unit, concatenation number, and concatenation type. When a contiguous concatenation path is requested, the PCReq message indicates the identifier of the source node that accesses a client-side service being N1, the identifier of the destination node being N3, the concatenation unit, and the concatenation number, and indicates the concatenation type being contiguous concatenation. When a virtual concatenation path is requested, the PCReq message indicates the identifier of the source node that accesses a client-side service being N1, the identifier of the destination node being N3, the concatenation unit, and the concatenation number, and indicates the concatenation type being virtual concatenation.

In step 103, the PCE computes a path according to the identifiers of the source node and the destination node that access a client-side service, the path concatenation constraint, and concatenation capabilities of each interface of nodes in a network.

The concatenation capabilities of each interface in the network stored on the PCE are as shown in Table 1:

| Interface Number | Link Time Slot State | Remote Interface Number |
| --- | --- | --- |
| I12 | 000111... | I21 |
| I14 | 110111... | I41 |
| I21 | 000111... | I12 |
| I23 | 000000... | I32 |
| I32 | 000000... | I23 |
| I41 | 110111... | I14 |

When the virtual concatenation is established, the concatenation capabilities of each interface of the nodes in the network are as shown in Table 2:

| Interface Number | Link Time Slot State | Link Delay | Whether The Virtual Concatenation Is Supported? | Interface Differential Delay Constraint | Remote Interface Number |
| --- | --- | --- | --- | --- | --- |
| I12 | 011111... | x0 ms | No | | I21 |
| I14 | 110111... | x3 ms | No | | I41 |
| I41 | 110111... | x3 ms | No | | I14 |
| I21 | 011111... | x0 ms | No | | I12 |
| I23 | 101111... | x0 ms | No | | I32 |
| I32 | 101111... | x0 ms | No | | I23 |
| I45 | 110111... | x0 ms | No | | I54 |
| I54 | 110111... | x0 ms | No | | I45 |
| I35 | 011111... | x5 ms | No | | I53 |
| I53 | 011111... | x3 ms | No | | I35 |
| I1 | 0 (All being idle) | 0 | Yes | X1 ms | 0 |
| I3 | 0 (All being idle) | 0 | Yes | X2 ms | 0 |

It should be noted that, various items representing the concatenation capabilities of the interfaces in Tables 1 and 2, such as, the link time slot state, the link delay, and the interface differential delay constraint, may be stored with the interface number and the remote interface number correspondingly. In order to describe the path computation method according to the embodiments of the present invention more clearly, this embodiment extracts Tables 1 and 2 satisfying computation of the contiguous concatenation and the virtual concatenation respectively from the stored information corresponding to the items of the concatenation capabilities of the interfaces.

The PCE excludes links not satisfying the constraints according to the identifiers of the source node and the destination node that access a client-side service, the concatenation unit, concatenation number, and concatenation type of the path, the differential delay constraints of the source node and the destination node, and the concatenation capabilities of the interfaces of the nodes in the network, and computes a concatenation path by using an algorithm. On the assumption that a bandwidth required by the client-side transmission service is 155 M/S, it is determined that a concatenation path needs to be established and that the path to be computed is a contiguous concatenation path. It is computed according to the bandwidth that two concatenation paths are required to transmit a client-side service, that is, it is required that the number of contiguous idle time slots of interface links is two. The PCE obtains paths I12-I21-I23-I32 satisfying the requirements through computation according to the concatenation constraint carried in the PCReq message and the concatenation capabilities of the interfaces of the nodes shown in Table 1 (for example, the link time slot state and numbers of corresponding interfaces and remote interfaces). On the assumption that a bandwidth required by the client-side transmission service is 155 M/S, it is determined that a concatenation path needs to be established and that the path to be computed is a virtual concatenation path. The PCE obtains paths I1-I12-I21-I23-I32-I3 and I1-I14-I41-I45-I54-I53-I35-I3 satisfying the requirements through computation according to the concatenation constraint carried in the PCReq message and the concatenation capabilities of the interfaces of the nodes shown in Table 2 (for example, information about the link time slot state, the link delay, and the interface differential delay constraint, and numbers of corresponding interfaces and remote interfaces).

In step 104, the PCE sends a path computation response message to the PCC, and the path computation response message carries path information obtained through computation.

The PCE sends the path information obtained through computation to the PCC through a PCReq message, and the path is a concatenation path that satisfies the concatenation constraint, where the concatenation constraint includes: the concatenation unit, the concatenation number, and the concatenation type, and the concatenation number is any value greater than 1 for the concatenation path.

In step 105, the PCC receives a path computation response message carrying path information returned by the PCE, and the path information is obtained by the PCE through computation according to the identifiers of the source node and the destination node that access a client-side service, the path concatenation constraint, and the concatenation capabilities of the interfaces of the nodes in the network.

The PCC establishes a connection according to the concatenation path and the path concatenation constraint.

So far, a path satisfying client-side signal transmission has been established at the service-side network.

Under the network architecture according to the embodiments of the present invention, the path computation method according to this embodiment is also applicable to single path computation. The differences between the single path computation and the above embodiment mainly lie in that, in step 101, the path concatenation constraint carried in the path computation request message sent by the PCC to the PCE includes the concatenation unit and the concatenation number, and the concatenation number is 1. In a PCReq message, the LSP number value indicating the concatenation number is 1, and a Concat. Type value indicating the concatenation type is 0. In step 102, the PCReq message carries the identifier of the source node that accesses a client-side service being N1, the identifier of the destination node being N3, the concatenation unit, and the concatenation number. In step 103, on the assumption that a bandwidth required by the client-side transmission service is 100 M/S, the node N1 determines that a path to be established is a single path and that a path to be computed is a single path, and the PCE obtains a path I12-I21-I23-I32 satisfying the requirements through computation according to the concatenation constraint carried in the PCReq message and the concatenation capabilities of the interfaces of the nodes shown in Table 1, where the concatenation capabilities of the interfaces used in the single path computation are mainly time slot states of interface links. In step 104, a path corresponding to the path information carried in the path computation response message is a single path conforming to requirements of the concatenation unit. After step 105, connection establishment for the single path does not need to depend on the concatenation constraint.

Embodiment 2

The embodiments of the present invention describe a path computation method, a node device and a PCE by taking an SDH network as an example. However, the computation method, the node device and the PCE according to the embodiments of the present invention are also applicable to other TDM networks, for example, an OTN.

According to the embodiments of the present invention, a PCE is constructed in a service-side network, and the PCE is a functional entity in the network responsible for path computation. Based on a known network topology structure and the constraint, the PCE computes a concatenation path satisfying a constraint according to a request from a PCC. The PCE may be located anywhere in the network, may be integrated in a network device, or may be an independent device. The PCC requests the PCE to compute a path and receives a path returned by the PCE. The PCC and the PCE, and PCEs conduct communication through a PCEP, and a PCEP message is configured to submit a path computation request and obtain a path computation result.

This embodiment describes the path computation method according to the embodiments of the present invention with computation of a contiguous concatenation path and a virtual concatenation path. In this embodiment, a node receiving a client-side transmission service request sends a path computation request message to a PCE, where the message carries a concatenation constraint for establishing a path, and the concatenation constraint includes concatenation unit, concatenation number, and concatenation type; and the PCE directly computes a path satisfying requirements according to the concatenation constraint after receiving the path computation request message.

The path computation method according to the embodiments of the present invention is described by taking the network structure in FIG. 1 as an example.

By taking an SDH network as an example, the service network consists of five nodes, interfaces of the nodes have corresponding interface numbers I1, I14, I12, I21, I23, I3, I32, I35, I53, I54, I45, and I41 (I represents Interface), and nodes N1 and N3 are connected to a client-side network respectively. In a network which is not divided into network domains, nodes are flooded with information of each interface, such as link time slot state of corresponding links, link delay, link-supported concatenation type, interface differential delay constraint, numbers of the interfaces, and numbers of interfaces connected to a remote end. For ease of description, in the embodiments of the present invention, the link time slot state of corresponding links of each interface, the link delay, the link-supporting concatenation type, the interface differential delay constraint, the interface number, and the numbers of interfaces connected to the remote end of the nodes in the network are called interface concatenation capability. For example, the node N1 may flood interface concatenation capabilities of interfaces I12, I14, and I1 to nodes N2, N3, N4, and N5 in the network and the PCE, and node N2 may flood interface concatenation capabilities of interfaces I21 and I23 to the nodes N2, N3, N4, and N5 in the network and the PCE. In a network which is divided into network domains, each node in the network sends concatenation capabilities of each interface to the PCE, and the PCE receives the concatenation capabilities of each interface of nodes in the network. Generally, PCEs in the network all possess a path computation capability, including capability of computing a single path, a contiguous concatenation path, and a virtual concatenation path. However, since network conditions differ from one another, PCEs in some networks may not possess the path computation capability, or only possess the capability of computing one of the contiguous concatenation path and the virtual concatenation path, or only possess the capability of computing the single path. To adapt to requirements of different networks, in the path computation method according to the embodiments of the present invention, the PCE sends its own path computation capability to all the nodes in the network.

According to the embodiments of the present invention, the nodes in the network send concatenation capabilities of each interface through a GMPLS OSPF-TE protocol message, and the PCE also sends its own path computation capability by using the GMPLS OSPF-TE.

To satisfy the demands of the capabilities of the nodes in the network, the embodiments of the present invention expand the GMPLS OSPF-TE protocol message, and increase a node interface concatenation capability object, where the node interface concatenation capability object is provided below:

```
+-+-+-+-+-+-+-+-+-+-+-+-+-+-+-+-+-+-+-+-+-+-+-+-+-+-+-+-+-+-+-+-+
|   Reserved    |    Flags   |c|v| Delay Diff. |   TS number   |
+-+-+-+-+-+-+-+-+-+-+-+-+-+-+-+-+-+-+-+-+-+-+-+-+-+-+-+-+-+-+-+-+
|                                                               |
//                       Time Slots Info.                      //
|                                                               |
+-+-+-+-+-+-+-+-+-+-+-+-+-+-+-+-+-+-+-+-+-+-+-+-+-+-+-+-+-+-+-+-+
```

When the flag bit v is 1, it indicates the link supports virtual concatenation, Delay Diff. indicates an interface differential delay constraint; when the flag bit c is 1, it indicates that the link supports contiguous concatenation; TS number represents the number of time slots; and Time Slots Info. represents occupation of each time slot in the link by means of a bitmap.

To satisfy the demand for sending its own path computation capability to the nodes in the network by the PCE, the embodiments of the present invention expand the GMPLS OSPF-TE protocol message, and increase a PCE path computation capability object specifically as follows:

```
+-+-+-+-+-+-+-+-+-+-+-+-+-+-+-+-+-+-+-+-+-+-+-+-+-+-+-+-+-+-+-+-
|   Reserved    |    Flags   |c|v|              Reserved       |
+-+-+-+-+-+-+-+-+-+-+-+-+-+-+-+-+-+-+-+-+-+-+-+-+-+-+-+-+-+-+-+-
```

When the flag bit c is 1, it indicates that the PCE has a contiguous concatenation path computation capability; and when the flag bit v is 1, it indicates that the PCE has a virtual concatenation path computation capability.

Finally, the nodes in the network store concatenation capabilities of interfaces of the nodes in the network and the path computation capability of the PCE. In the network which is divided into network domains, the nodes in the network store concatenation capabilities of interfaces of a node in a network domain and the path computation capability of the PCE in the network. The PCE stores the concatenation capabilities of interfaces of the nodes in the network.

When the node N1 connected to the client-side network receives a client-side service transmission request, the node N1 determines a concatenation constraint needing to be provided, such as concatenation number, concatenation unit, and concatenation type, according to a bandwidth required by the request, an identifier of a destination node requesting service transmission, and a signal type of a client-side transmission service, and sends a path computation request to the PCE.

Figure 3:
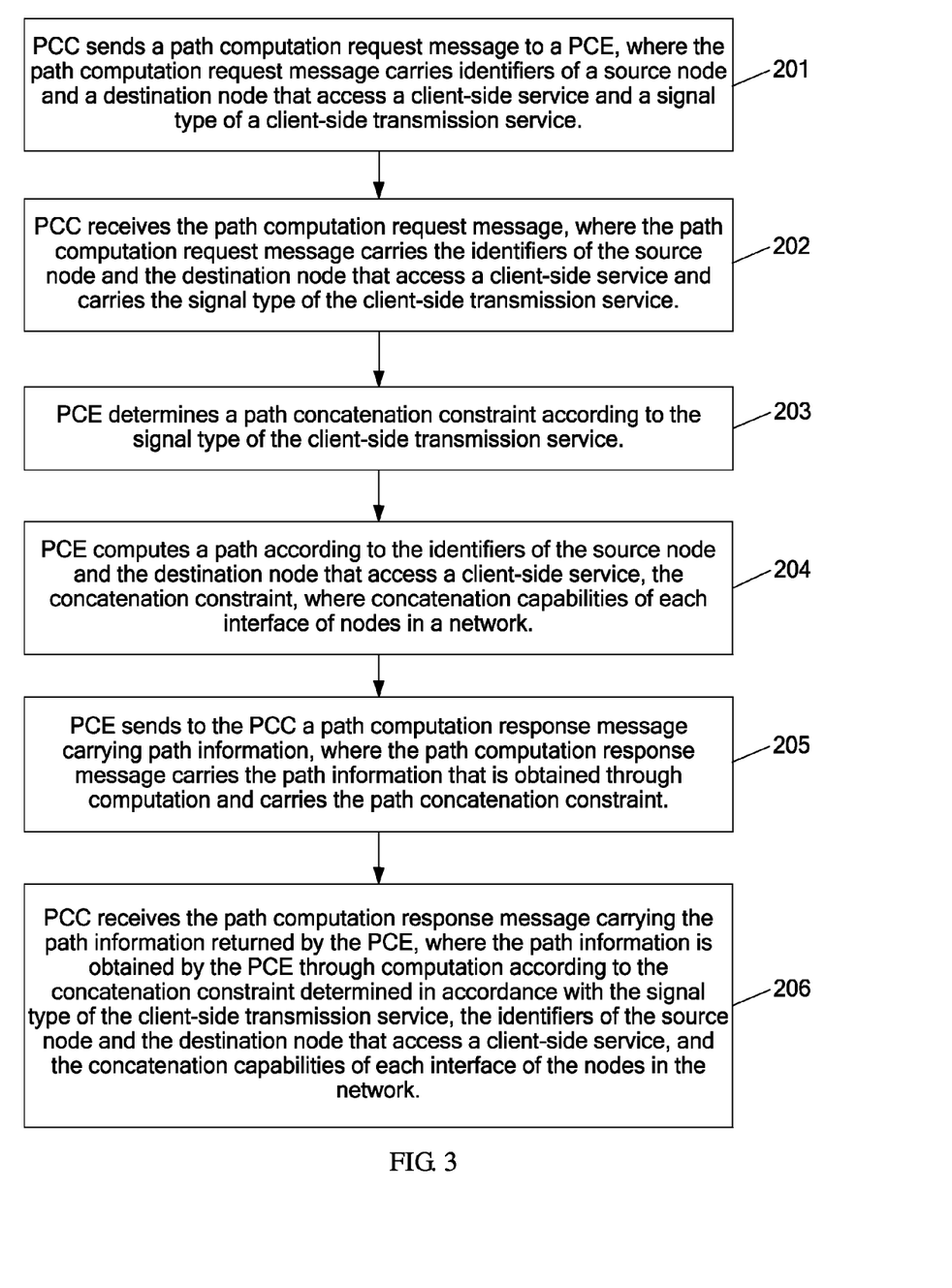
FIG. 3 is a flowchart of a path computation method according to a second embodiment of the present invention.

FIG. 3 is a flowchart of a path computation method according to a second embodiment of the present invention.

In step 201, a PCC sends a path computation request message to a PCE, the path computation request message carrying identifiers of a source node and a destination node that access a client-side service and carrying a signal type of a client-side transmission service.

Referring to FIG. 1, the node N1 serves as the PCC to send a path computation request message to the PCE.

On the assumption that the node N1 receives a client-side service transmission request, the node N1 serves as a head node of a path, and the node N3 serves as an egress node of the path. The node N1 serves as the PCC to send a path computation request message to a PCE, and sends a path computation request through a PCReq message in a PCEP protocol. The PCReq message (the path computation request message) carries identifiers of a source node and a destination node that access a client-side service and carrying information about a signal type of a client-side transmission service. The information about the signal type of the client-side transmission service includes information such as a bandwidth required by the client-side transmission service.

In step 202, the PCE receives the path computation request message, the path computation request message carrying the identifiers of the source node and the destination node that access a client-side service and the signal type of the client-side transmission service.

In step 203, the PCE determines a path concatenation constraint according to the signal type of the client-side transmission service.

When contiguous concatenation path computation is requested, the concatenation constraint includes concatenation unit, concatenation number, and concatenation type, where the concatenation type is designated to be contiguous concatenation; and when virtual concatenation path computation is requested, the concatenation constraint includes concatenation unit, concatenation number, and concatenation type, where the concatenation type is designated to be virtual concatenation.

In step 204, the PCE computes a path according to the identifiers of the source node and the destination node that access a client-side service, the concatenation constraint, and concatenation capabilities of each interface of nodes in a network.

The PCE excludes links not satisfying the constraints according to the concatenation capabilities of the each interface of the nodes and the concatenation constraints stored as in Tables 1 and 2, and computes a concatenation path by using an algorithm.

In step 205, the PCE sends to the PCC a path computation response message carrying path information, and the path computation response message carries the path information obtained through computation and the path concatenation constraint.

In step 206, the PCC receives the path computation response message carrying the path information returned by the PCE, and the path information is obtained by the PCE through computation according to the concatenation constraint determined in accordance with the signal type of the client-side transmission service, the identifiers of the source node and the destination node that access a client-side service, and the concatenation capabilities of the each interface of the nodes in the network.

The embodiments of the present invention expand a PCEP protocol, so as to carry a concatenation constraint including concatenation unit, concatenation number, and concatenation type in a PCReq message. A concatenation constraint object is increased in the PCReq message, and the format of the object is provided below:

```
+-+-+-+-+-+-+-+-+-+-+-+-+-+-+-+-+-+-+-+-+-+-+-+-+-+-+-+-+-+-+-+--
| LSP Enc. Type | Switching Type |Src Delay Diff. | Dst Delay Diff. |
+-+-+-+-+-+-+-+-+-+-+-+-+-+-+-+-+-+-+-+-+-+-+-+-+-+-+-+-+-+-+-+--
| Signal Type   | Concat. Type   |    Reserved    |   LSP number   |
+-+-+-+-+-+-+-+-+-+-+-+-+-+-+-+-+-+-+-+-+-+-+-+-+-+-+-+-+-+-+-+--
```

The concatenation unit is determined according to "LSP Enc. Type," "Switching Type" and "Signal Type." For example, when the concatenation unit is ODU2, LSP Enc. Type=12 (G.709 ODUk), Switching Type=100 (TDM), and Signal Type=2 (ODU2). When the concatenation unit is VC4, LSP Enc. Type=5 (SDH ITU-T G.707/SONET ANSI T1.105), Switching Type=100 (TDM), and Signal Type=6 (VC4).

Concat. Type indicates the concatenation type, and is currently defined as: 1 representing the contiguous concatenation, and 2 representing the virtual concatenation.

LSP number indicates the concatenation number, and when the path to be computed is the contiguous concatenation path or virtual concatenation path, the value is any value greater than 1.

Src Delay Diff. indicates a differential delay constraint of the source node; and Dst Delay Diff. indicates a differential delay constraint of the destination node.

The PCC establishes a connection according to the concatenation path and the concatenation constraint.

So far, a path satisfying client-side signal transmission has been established at the service network.

Under the network architecture according to the embodiments of the present invention, the path computation method according to this embodiment is also applicable to single path computation. The differences between the single path computation and the above-mentioned embodiment mainly lie in that, in step 203, when the PCE determines that the path to be established is a single path, the determined concatenation constraint includes concatenation unit and concatenation number, and the concatenation number is 1; in step 204, the concatenation capabilities of the interfaces used in the single path computation are mainly the link time slot state of the interfaces; in step 205, in a PCReq response message, the Concat. Type value indicating the concatenation type is 0 and the LSP number value indicating the concatenation number is 1, and a path corresponding to the path information carried in the path computation response message is a single path; and after step 206, connection establishment for the single path does not need to depend on the concatenation constraint.

Embodiment 3

The embodiments of the present invention further provide a node device and a PCE using the above method.

Figure 4:
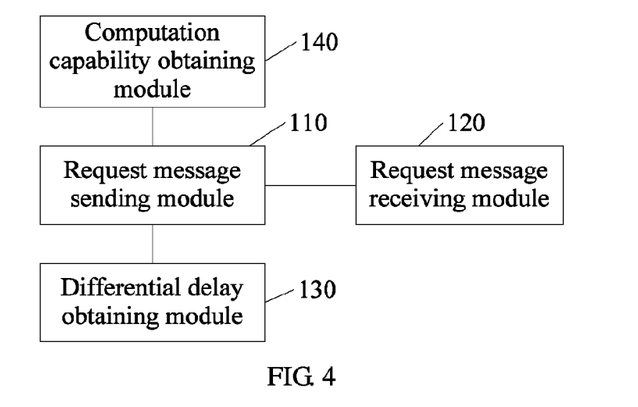
FIG. 4 is a schematic structural view of a node device according to a third embodiment of the present invention.

FIG. 4 is a schematic structural view of a node device according to a third embodiment of the present invention.

A node device is provided, where the node device includes:

a request message sending module 110, configured to send a path computation request message to a PCE after receiving a client-side service transmission request, where the path computation request message carries identifiers of a source node and a destination node that access a client-side service and carrying a path concatenation constraint; and a request message receiving module 120, configured to receive a path computation response message carrying path information returned by the PCE after the request message sending module sends the path computation request message to the PCE, the path information being obtained by the PCE through computation according to the identifiers of the source node and the destination node that access a client-side service, the concatenation constraint, and concatenation capabilities of each interface of nodes in a network.

Further, the node device may further include:

a differential delay obtaining module 130, configured to obtain a differential delay constraint of the destination node that accesses a client-side service after receiving the client-side service transmission request and before sending the path computation request message to the PCE, where the concatenation constraint in the path computation request message includes: concatenation unit, concatenation type, and concatenation number, and the concatenation number is greater than 1; and the path computation request message sent by the request message sending module 110 further carrying a differential delay constraint of the source node that accesses a client-side service and the differential delay constraint of the destination node that accesses a client-side service.

Further, the node device may further include:

a computation capability obtaining module 140, configured to obtain a path computation capability of the PCE before the request message sending module 110 sends the path computation request message to the PCE, the capability of the PCE including at least one of the following: a single path computation capability, a contiguous concatenation path computation capability, and a virtual concatenation path computation capability.

For another node device according to the embodiments of the present invention, the path computation request message sent by the node request message sending module according to this embodiment only carries the identifiers of the source node and the destination node and a signal type of a client-side transmission service, but may not carry the path concatenation constraint.

A node device is provided, where the node device includes:

a request message sending module, configured to send a path computation request message to a PCE after receiving a client-side service transmission request, the path computation request message carrying identifiers of a source node and a destination node that access a client-side service and carrying a signal type of a client-side transmission service; and a response message receiving module, configured to receive a path computation response message carrying path information returned by the PCE, the path information being obtained by the PCE through computation according to a concatenation constraint determined in accordance with the signal type of the client-side transmission service, the identifiers of the source node and the destination node that access a client-side service, and concatenation capabilities of each interface of nodes in a network.

Further, the node device may further include:

a differential delay obtaining module, configured to obtain a differential delay constraint of the destination node that accesses a client-side service after the request message sending module receives the client-side service transmission request, where a concatenation constraint in the path computation request message includes: concatenation unit, concatenation type, and concatenation number, and the concatenation number is greater than 1; and the path computation request message sent by the request message sending module further carrying a differential delay constraint of the source node that accesses a client-side service and the differential delay constraint of the destination node that accesses a client-side service.

Further, the node device may include: a computation capability obtaining module, configured to obtain a path computation capability of the PCE before the request message sending module sends the path computation request message to the PCE; the capability of the PCE including at least one of the following: a single path computation capability, a contiguous concatenation path computation capability, and a virtual concatenation path computation capability.

Embodiment 4

The embodiments of the present invention further provide a PCE using the above method.

Figure 5:
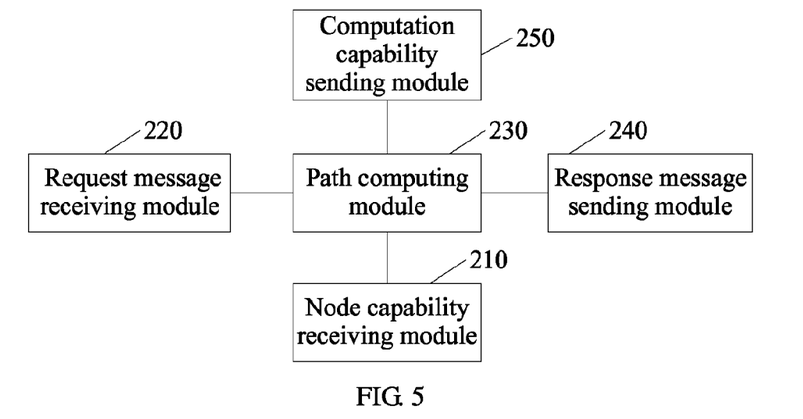
FIG. 5 is a schematic structural view of a PCE according to a fourth embodiment of the present invention.

FIG. 5 is a schematic structural view of a PCE according to a fourth embodiment of the present invention.

A PCE is provided, where the PCE includes:

a node capability receiving module 210, configured to receive concatenation capabilities of each interface, where the concatenation capabilities of each interface are sent by nodes in a network;

a request message receiving module 220, configured to receive a path computation request message, the path computation request message carrying identifiers of a source node and a destination node that access a client-side service and carrying a path concatenation constraint;

a path computing module 230, configured to compute a path according to the identifiers of the source node and the destination node that access a client-side service, the path concatenation constraint, and the concatenation capabilities of each interface of the nodes in the network; and a response message sending module 240, configured to send a path computation response message carrying path information obtained through computation.

Further, the PCE may further include:

a computation capability sending module 250, configured to send its own path computation capability before the request message receiving module receives the path computation request message; the path computation capability including at least one of the following: a single path computation capability, a contiguous concatenation path computation capability, and a virtual concatenation path computation capability.

Embodiment 5

The embodiments of the present invention further provide another PCE, and the PCE according to the embodiments computes a path concatenation constraint according to a client-side signal type.

Figure 6:
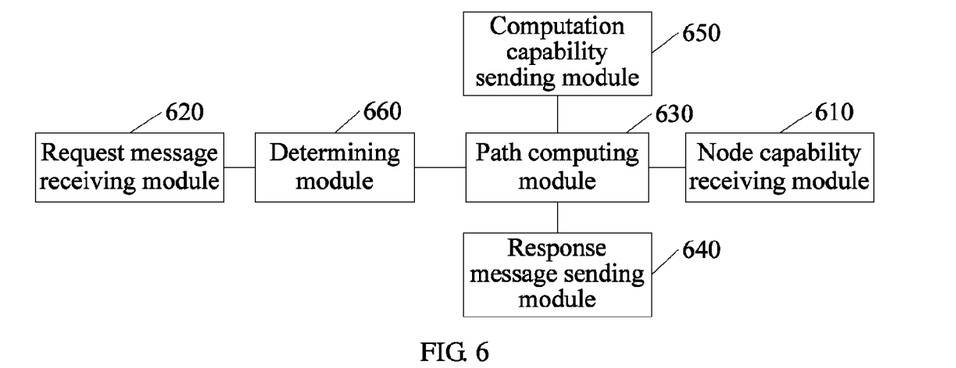
FIG. 6 is a schematic structural view of a PCE according to a fifth embodiment of the present invention.

FIG. 6 is a schematic structural view of a PCE according to a fifth embodiment of the present invention.

In this embodiment, the PCE computes a path concatenation constraint according to a signal type of a client-side service, and computes a path according to the path concatenation constraint.

A PCE is provided, where the PCE includes:

a node capability receiving module 610, configured to receive concatenation capabilities of each interface, where the concatenation capabilities of each interface are sent by nodes in a network;

a request message receiving module 620, configured to receive a path computation request message, the path computation request message carrying identifiers of a source node and a destination node that access a client-side service and carrying a signal type of a client-side transmission service;

a determining module 660, configured to determine a path concatenation constraint according to the signal type of the client-side transmission service;

a path computing module 630, configured to compute a path according to the identifiers of the source node and the destination node that access a client-side service, the concatenation constraint, and the concatenation capabilities of the each interface of the nodes in the network; and a response message sending module 640, configured to send a path computation response message carrying path information obtained through computation.

Further, the PCE may further include:

a computation capability sending module 650, configured to send its own path computation capability before the request message receiving module 620 receives the path computation request message, where the path computation capability includes at least one of the following: a single path computation capability, a contiguous concatenation path computation capability, and a virtual concatenation path computation capability.

Contents such as specific signal processing and implementing process between modules in the node device and the PCE are not repeated since they are based on the same concept as that of the embodiments of the method according to the present invention. Please refer to the descriptions in Embodiments 1, 2, and 3 of the present invention.

Through the above description of the implementation, it is clear to persons skilled in the art that the present invention may be accomplished through software plus a necessary hardware platform or through hardware, but the former is a preferred implementation in many cases. Based on this, all or part of the technical solutions of the present invention making contributions to the background art may be embodied in the form of a software product. The computer software product may be stored in a storage medium, such as ROM/RAM, a magnetic disk, and an optical disk, and contain several instructions configured to instruct computer equipment (for example, a personal computer, a server, or network equipment) to perform the method(s) according to the embodiments or certain parts of the embodiments of the present invention.

The path computation method, the node device, and the PCE according to the embodiments of the present invention are described in detail above. The principle and implementation of the present invention are described herein through specific examples. The description about the embodiments of the present invention is merely provided for ease of understanding of the technical solutions of the present invention. Persons of ordinary skill in the art can make variations and modifications to the present invention in terms of the specific implementations and application scopes according to the principle of the present invention. Therefore, the specification shall not be construed as a limit to the present invention.

What is claimed is:

1. A path computation method, comprising:

receiving concatenation capabilities of each interface of nodes in a network;

receiving a path computation request (PCReq) message in a path computation element protocol (PCEP), the PCReq message carrying identifiers of a source node and a destination node that access a client-side service and carrying encoding type, switching type, signal type, concatenation number, and concatenation type, wherein the concatenation number is greater than 1;

determining the encoding type is optical channel data unit k (ODUk), the switching type is time division multiplexing (TDM) and the signal type is optical channel data unit 2 (ODU2), when a value of the encoding type is 12, a value of the switching type is 100 and a value of the signal type is 2;

determining the encoding type is synchronous digital hierarchy/Synchronous optical network (SDH/SONET), the switching type is TDM and the signal type is VC4, when the value of the encoding type is 5, the value of the switching type is 100 and the value of the signal type is 6;

computing a path according to the identifiers of the source node and the destination node that access a client-side service, the encoding type, the switching type, the signal type, the concatenation number, the concatenation type, and the concatenation capabilities; and sending a PCReq response message in the PCEP carrying path information corresponding to the computed path.

2. The path computation method according to claim 1, comprising: sending its own path computation capability before receiving the PCReq message, the path computation capability comprising at least one of the following: a single path computation capability, a contiguous concatenation path computation capability, and a virtual concatenation path computation capability.

3. The path computation method according to claim 1, wherein the concatenation capabilities comprise link time slot state, link delay, link-supporting concatenation type, interface differential delay constraint, interface number, and interface number connected to the remote end corresponding to each interface of the nodes in the network.

4. A path computation method, comprising:
sending a path computation request (PCReq) message in a path computation element protocol (PCEP) to a path computation element (PCE) after receiving a client-side service transmission request, the PCReq message carrying identifiers of a source node and a destination node that access a client-side service and carrying encoding type, switching type, signal type, concatenation number, and concatenation type, wherein the concatenation number is greater than 1;
wherein a value of the encoding type is 12, a value of the switching type is 100 and a value of the signal type is 2, indicating the encoding type is optical channel data unit k (ODUk), the switching type is time division multiplexing (TDM) and the signal type is optical channel data unit 2 (ODU2);
wherein the value of the encoding type is 5, the value of the switching type is 100 and the value of the signal type is 6, indicating the encoding type is synchronous digital hierarchy/Synchronous optical network (SDH/SONET), the switching type is TDM and the signal type is VC4; and
receiving a PCReq response message in the PCEP carrying path information corresponding to a path returned by the PCE, the path being obtained by the PCE through computation according to the identifiers of the source node and the destination node that access a client-side service, the encoding type, the switching type, the signal type, the concatenation number, the concatenation type and concatenation capabilities of each interface of nodes in a network.

5. The path computation method according to claim 4, wherein:
after receiving the client-side service transmission request, the method further comprises: obtaining a differential delay constraint of the destination node that accesses a client-side service; and
the PCReq message further carries a differential delay constraint of the source node that accesses a client-side service and the differential delay constraint of the destination node that accesses a client-side service.

6. The path computation method according to claim 4, comprising: obtaining a path computation capability of the PCE before the sending the PCReq message to the PCE, and the path computation capability comprising at least one of the following: a single path computation capability, a contiguous concatenation path computation capability, and a virtual concatenation path computation capability.

7. The path computation method according to claim 4, wherein the concatenation capabilities comprise link time slot state, link delay, link-supporting concatenation type, interface differential delay constraint, interface number, and interface number connected to the remote end corresponding to each interface of the nodes in the network.

8. A node device, comprising:
a request message sending module, configured to send a path computation request (PCReq) message in a path computation element protocol (PCEP) to a path computation element (PCE) after receiving a client-side service transmission request, the PCReq message carrying identifiers of a source node and a destination node that access a client-side service and carrying encoding type, switching type, signal type, concatenation number, and concatenation type, wherein the concatenation number is greater than 1;
wherein a value of the encoding type is 12, a value of the switching type is 100 and a value of the signal type is 2, indicating the encoding type is optical channel data unit k (ODUk), the switching type is time division multiplexing (TDM) and the signal type is optical channel data unit 2 (ODU2);
wherein the value of the encoding type is 5, the value of the switching type is 100 and the value of the signal type is 6, indicating the encoding type is synchronous digital hierarchy/Synchronous optical network (SDH/SONET), the switching type is TDM and the signal type is VC4; and
a response message receiving module, configured to receive a PCReq response message carrying path information corresponding to a path returned by the PCE after the request message sending module sends the PCReq message to the PCE; the path being obtained by the PCE through computation according to the identifiers of the source node and the destination node that access a client-side service, the encoding type, the switching type, the signal type, the concatenation number, the concatenation type, and concatenation capabilities of each interface of nodes in a network.

9. The node device according to claim 8, further comprising:
a differential delay obtaining module, configured to obtain a differential delay constraint of the destination node that accesses a client-side service after the request message sending module receives a client-side service transmission request; and
the PCReq message further carrying a differential delay constraint of the source node that accesses a client-side service and the differential delay constraint of the destination node that accesses a client-side service.

10. The node device according to claim 8, further comprising:
a computation capability obtaining module, configured to obtain a path computation capability of the PCE before the request message sending module sends the PCReq message to the PCE, the capability of the PCE comprising at least one of the following: a single path computation capability, a contiguous concatenation path computation capability, and a virtual concatenation path computation capability.

* * * * *